May 12, 1953 — G. R. JEWELL — 2,638,375
STAKE RACK LATCH
Filed July 18, 1950 — 4 Sheets-Sheet 1

Inventor
Gordon R. Jewell
By Willits, Helwig & Baillio
Attorneys

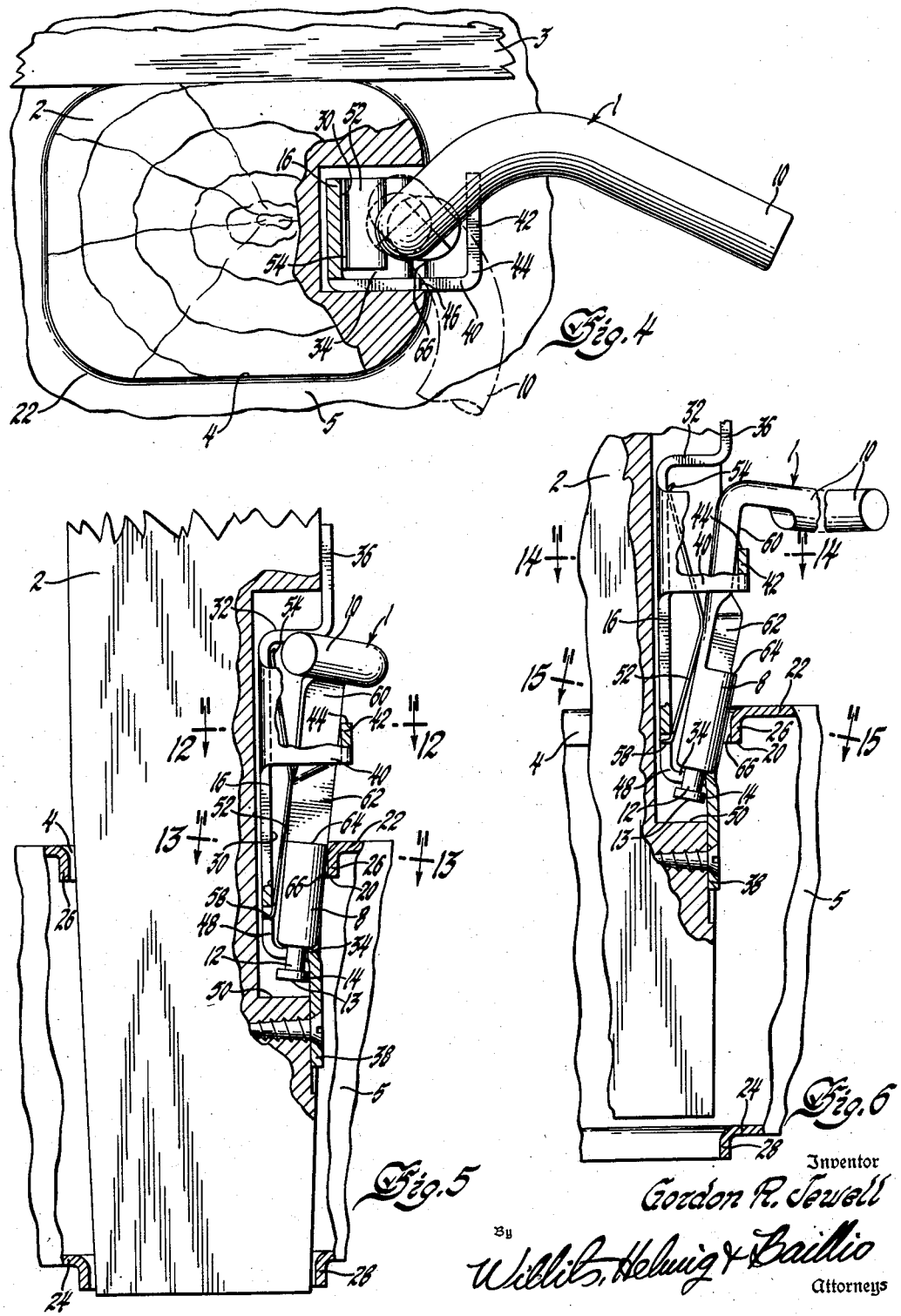

May 12, 1953     G. R. JEWELL     2,638,375
STAKE RACK LATCH

Filed July 18, 1950     4 Sheets-Sheet 3

Inventor
Gordon R. Jewell
By Willis, Helmig & Baillie
Attorneys

May 12, 1953　　　　G. R. JEWELL　　　　2,638,375
STAKE RACK LATCH

Filed July 18, 1950　　　　　　　　　　　　4 Sheets-Sheet 4

Inventor
Gordon R. Jewell
By Willito, Helwig & Baillio
Attorneys

Patented May 12, 1953

2,638,375

UNITED STATES PATENT OFFICE 2,638,375

STAKE RACK LATCH

Gordon Rolland Jewell, Indianapolis, Ind., assignor to General Motors Corporation, Detroit, Mich., a corporation of Delaware Application July 18, 1950, Serial No. 174,447

16 Claims. (Cl. 296—43)

This invention relates to latching devices for removably securing a member in a socket, as for example the truck rack stakes in the sockets provided therefor in the rub rail around the load platform.

The objects of the invention are to provide such a latch which will permit easy installation of the stake into its socket and easy operation of the latch to a position wherein the stake can be withdrawn without the operator being required to hold the latch in its unlocked position while withdrawing the stake; to provide a latch which after the stake has been removed from the socket will snap back into such a position that upon reinsertion of the stake the latch will automatically lock; to so arrange the latch on the stake as to render the latch invulnerable to damage when the stake is either in or out of its socket; to arrange the latch for convenient operation either from inside or outside the load compartment of the truck to which it is adapted; and to provide a latch which may be conveniently assembled into existing truck stakes.

In general the latching device of my invention comprises a rotary bolt adapted to be mounted to a side of the stake member and having cam faces which cooperate with the side of the stake socket and a retainer on the stake during rotation of the bolt between locked and unlocked positions, in such a manner that the bolt will remain in a locked position after being manually moved into locked position while the stake is in the socket, but will automatically rotate back to its normal locked position upon withdrawal of the stake from the socket, spring means being effective to hold the bolt in either its locked or unlocked positions.

Referring to the drawings:

Figure 4 is a plan view taken from line 4—4 of Figure 1 showing the latch in locked position in solid lines, and unlocked position in broken lines.

Figure 5 is a view similar to Figure 2, but with the stake partially removed from its socket, the latch remaining in its unlocked position as in Figure 3.

Figure 6 is a view similar to Figure 2 but with the stake further withdrawn from the socket sufficiently to allow the latch to automatically return to its locking position of Figure 2.

Figure 1:
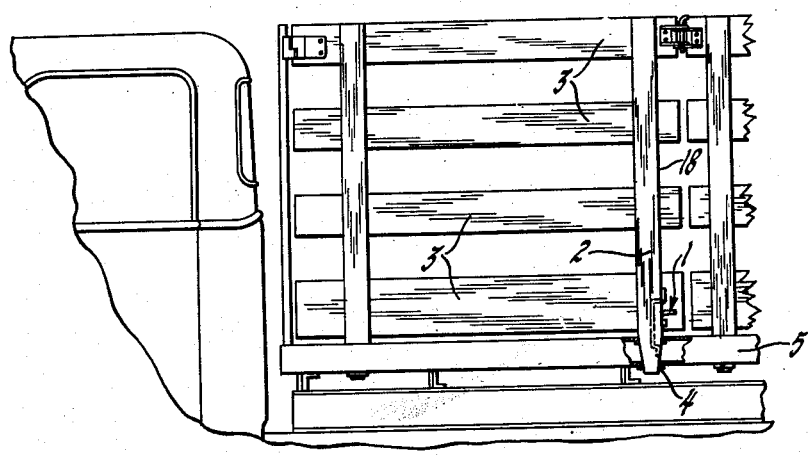
Figure 1 is a view in side elevation of a conventional stake body truck incorporating the latching device of my invention for securing a rack stake in place.
Figure 2:
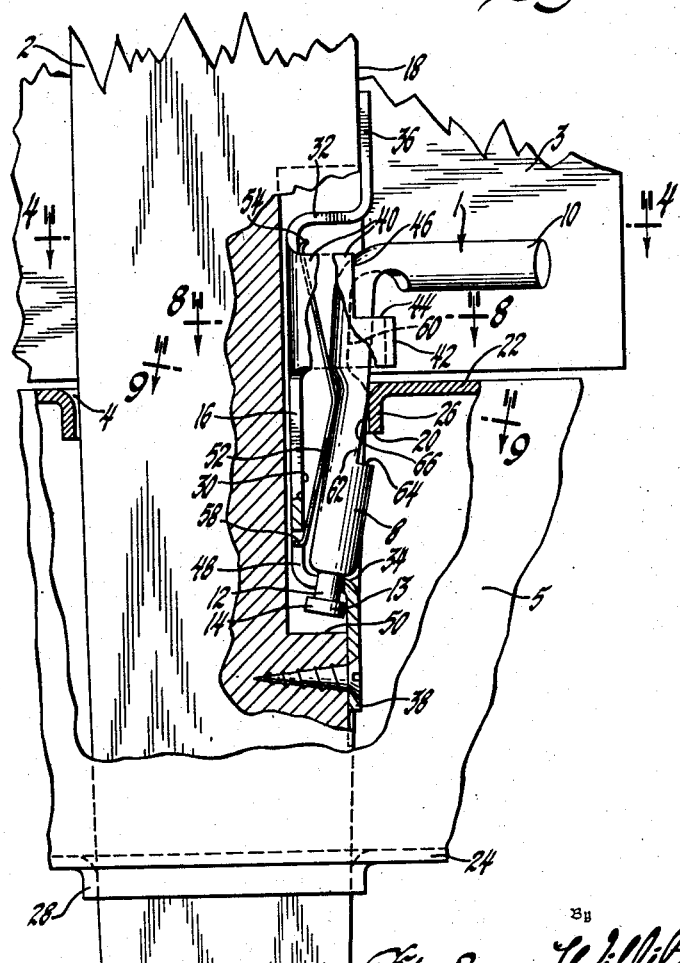
Figure 2 is an enlarged fragmentary view similar to Figure 1 showing the details of my latching device in locked position with the stake fully seated in its socket.
Figure 8:
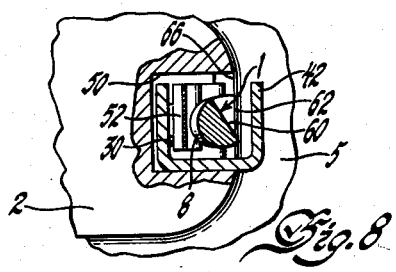
Figure 9:
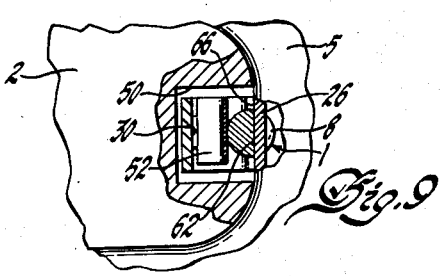

Figures 8 and 9 are sectional views taken on lines 8—8 and 9—9 respectively of Figure 2.

Figure 3:
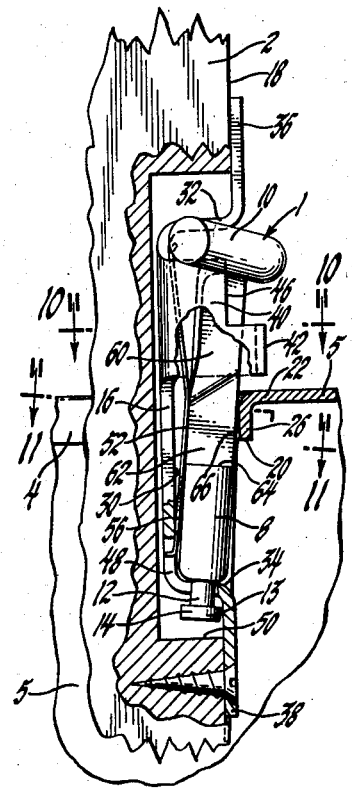
Figure 3 is a view similar to Figure 2, but with the latch moved to unlocked position.
Figure 10:
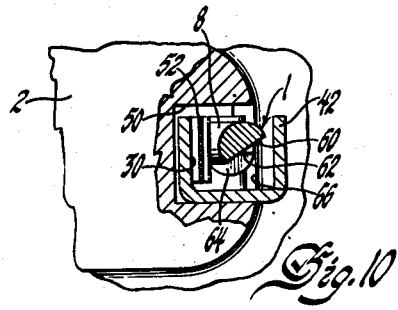
Figure 11:
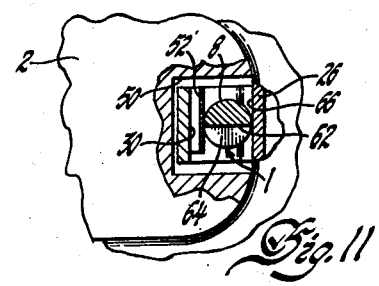

Figures 10 and 11 are sectional views taken on lines 10—10 and 11—11 of Figure 3.

Figure 12:
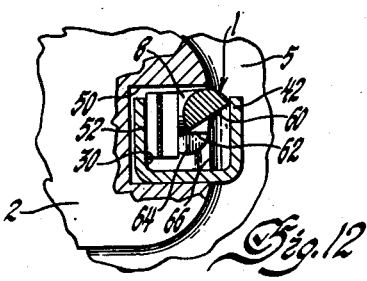
Figure 13:
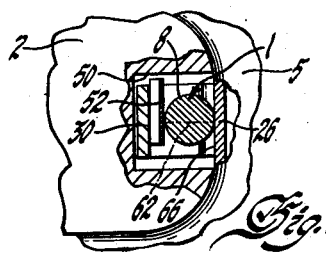

Figures 12 and 13 are sectional views taken on lines 12—12 and 13—13 of Figure 5.

Figure 14:
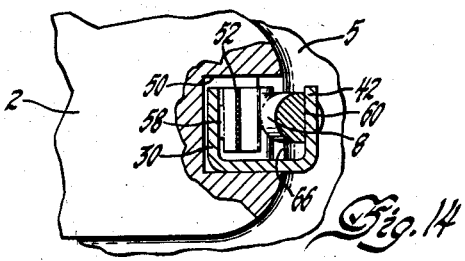
Figure 15:
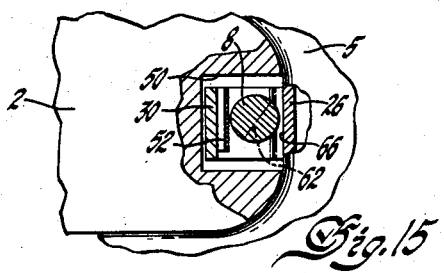

Figures 14 and 15 are sectional views taken on lines 14—14 and 15—15 of Figure 6.

Figure 7:
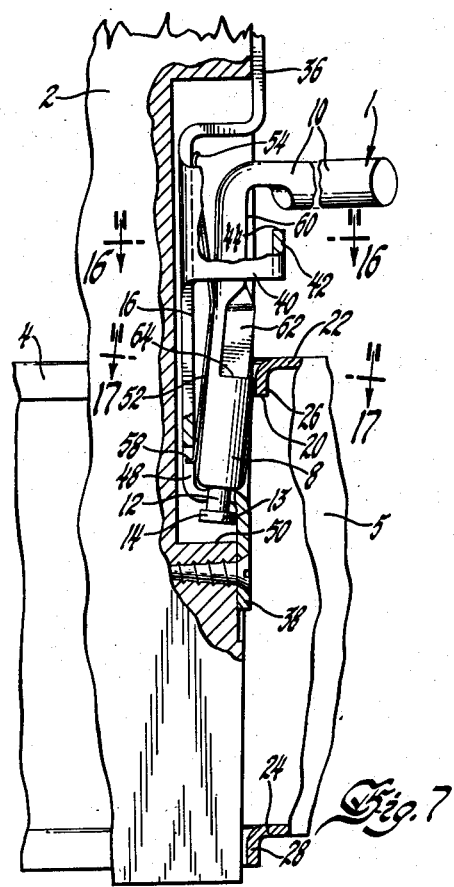
Figure 7 is a view similar to Figure 2 but showing the position of the latch during insertion of the stake into the socket.
Figure 16:
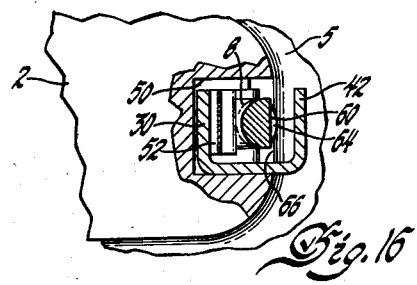
Figure 17:
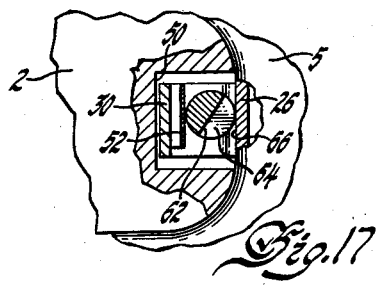

Figures 16 and 17 are sectional views taken on lines 16—16 and 17—17 of Figure 7.

Figure 18:
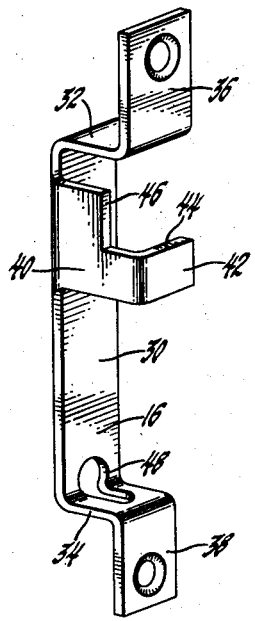

Figure 18 is a perspective view of the latch supporting bracket.

Figures 19, 20:
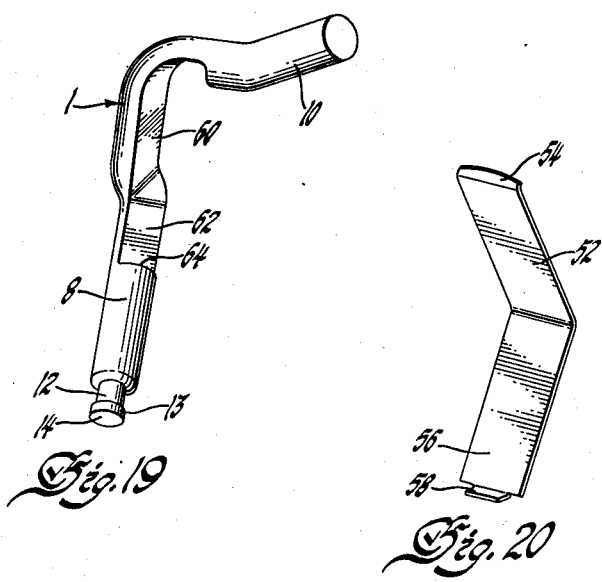

Figure 19 is a perspective view of the latch bolt.

Figure 20 is a perspective view of the bolt biasing spring.

Referring now in detail to the drawings, I have shown my latch in the form of a bolt 1 arranged for removably securing the stake 2 of a truck body side rack 3 against accidental withdrawal from the stake socket 4 provided in the truck body rub rail 5. The bolt 1 has an elongated shank portion 8 terminating at one end in a handle 10 and at its opposite end 13 in a retaining button 14 axially adjacent a reduced diameter portion or neck 12. The bolt is secured for universal pivotal movement about its end 13 by a bracket 16 which is fastened to the side 18 of the stake 2 opposite a keeper 20 in the stake socket 4. As shown for example in Figure 2, the stake socket 4 is defined by the upper and lower plates 22 and 24 of the body rub rail 5, these plates being apertured and downwardly flanged as at 26 and 28 with the end face of the flange 26 serving as the keeper 20 for the latch bolt 1.

The bolt supporting bracket 16 is shown in detail in Figure 18 and comprises a back plate 30, with upper and lower ends 32 and 34 bent at right angles to the back plate and terminating in attaching tabs 36 and 38. Integral with and extending perpendicularly from one side edge of the back plate 30 is a partial side wall 40 terminating in a flange 42 which serves as a retainer for the bolt. The width of the side wall 40 and flange 42 is cut away as at 44 to provide an abutment 46 for limiting rotation of the bolt handle 10 to its unlocked position. A key-slot opening 48 is provided in this bracket at the juncture of the back plate 30 and lower end 34 to removably secure the end 13 of the latch bolt. The larger end of this aperture 48 is formed in the back plate 30 and is of sufficient size to pass the button 14, while the narrower portion of the aperture which is formed in the end plate 34 slidably accommodates the neck 12 of the bolt but retains the button 14.

A recess 50 as shown in Figure 2 is provided in the side 18 of the stake to receive the back plate 30, ends 32 and 34, and side wall 40 of this bracket. The bolt 1 is thus also recessed in the side of the stake with its shank portion 8 extending longitudinally of the stake for insertion therewith into the socket 4, and is thereby protected from injury both when the stake is in and out of its socket.

Resilient means in the form of a bowed flat-section spring 52 is provided for biasing the bolt shank outwardly of the recess 50. Opposite ends 54 and 56 of this spring abut the bracket back plate 30 while the body of the spring intermediate its ends bears against the bolt shank 8. The lower end 56 has an extending tab portion 58 of reduced width loosely fitting the larger end of the key-slot 48.

The shank 8 of the bolt is thus retained at two axially remote points by the bracket 16 and has freedom to rotate about its axis and to tilt about its lower end 13 toward and away from the side 18 of the stake. During this tilting and rotary movement, the connection afforded by the neck 12 loosely engaging the aperture 48 acts as a universal joint, the side wall 40 and retainer flange 42 serving merely as guide and limit means for the bolt shank 8.

Upper and lower cam surfaces such as the flats 60 and 62 are provided on the side of the shank, the lower flat 62 terminating in a shoulder or ledge 64 which underlies the keeper when the stake is seated in its socket. With the bolt in "locking" position, the spring 52 holds the flat 62 of the bolt in abutment with the side 66 of the socket when the stake is in the socket (Figure 2) and holds the upper flat 60 on the bolt against the retainer flange 44 of the bracket when the stake is out of the socket (Figure 6). The abutting engagement in each instance serves to rotatively position the bolt shank for latchable engagement of its ledge 64 with the keeper 20.

It will be noted that the flats 60 and 62 are angularly related to each other about the axis of the bolt shank, the upper flat 60 being turned approximately 30 degrees from the plane of the lower flat 62, in a counterclockwise direction as viewed from the handle end of the bolt shank. The purpose of this angular relation of the flats is to enable the spring to automatically return the bolt to its locking position upon withdrawal of the stake from the socket. Referring to Figures 8 and 9, it will be seen that when the stake and bolt are in their respective seated and locking positions shown in Figure 2, the lower flat 62 is in substantial mating engagement with the side 66 of the socket, and the upper flat 60 is unrestrained by and angularly disposed to the retainer 42. Upon rotating the bolt shank in a clockwise direction to the position shown in Figure 3, the lower flat 62 takes a position substantially perpendicular to both the socket side 66 and spring 52 (Figure 11) and the upper flat 60 assumes its angular position with respect to the retainer 42 shown in Figure 10, the shank remaining unrestrained by the retainer 42. The shank at this time is held clamped between the spring and the socket flange 26 under sufficient pressure to frictionally restrain its retrograde rotation and thus need not be manually held in this position by the handle 10 during withdrawal of the stake from the socket.

During the withdrawal of the stake, the bolt shank continues to be frictionally restrained against rotation until the stake is raised to the position shown in Figure 5, wherein the ledge 64 is above the keeper 20 and the shank has been tilted outwardly from the stake into engagement with the retainer 42. Continued withdrawal of the stake results in the bolt shank no longer being supported by the socket flange 26, and the force of the spring 52 in conjunction with the angularity of the upper flat 60 to the retainer 42 results in the bolt being rotatively cammed in a counterclockwise direction to the position shown in Figure 6. In this latter position as will be seen in Figures 14 and 15 the upper flat 60 is substantially parallel with the retainer 42 and the lower flat 62 is angularly disposed to the surface 66 of the socket flange 26.

Figure 7 shows an intermediate stage during reinsertion of the stake into the socket, wherein the bolt shank has been tilted inwardly toward the stake by the socket flange 26 sufficiently to again move the upper flat 60 out of engagement with the retainer 42. In this Figure 7 position, however, the stake has not been inserted far enough into the socket to bring the ledge 64 into latchable position with the keeper 20. During the insertion of the stake to the Figure 7 position the bolt will remain in substantially the same position rotatively of its shank axis as it occupied in the Figure 6 position, as will be seen by comparing Figures 16 and 17 with Figures 14 and 15. Continued movement of the stake toward its fully socketed position of Figure 2 results in the latch 64 reaching a position below the keeper 20 at which time the pressure imposed on the bolt shank by the socket flange 26 is exerted against the nearer edge of the lower flat 62 whereupon the shank is rotatively cammed to the position of Figure 2.

Thus the operator may effect the removal of the truck side rack 3 by simply moving the bolt handle 10 from its normal position shown in solid lines in Figure 4 (in the plane of the rack 3) to its outwardly projecting position shown in broken lines in Figure 4, and then lifting the rack to clear the stakes 2 from their sockets. It is unnecessary during this lifting operation to hold the handle in its unlocked position, nor is it necessary to manually return the handle to its locked position after removal of the rack and preliminary to its reinstallation on the truck body. Since the handle will be normally disposed at all times in the plane of the rack it is not vulnerable to injury either with the rack in place or removed from the truck.

While the latch has been shown in association with the side rack of a stake body truck, it will be understood that it is equally applicable for use in retaining the truck body end rack in a similar manner. In either case, the latch has the advantage of being releasable from either outside or inside of the load compartment of the truck, obviating the necessity for the truck operator to release the latch prior to positioning his truck close to the loading dock.

The latching device of my invention may be easily installed on existing truck racks since it is only necessary to route out the stake to provide the relatively small recess 50 to receive the bracket 16.

I claim:

1. In a stake locking device for a truck or the like having a body provided with a stake socket and a keeper at one side of said socket, a stake insertable into the socket, a latch having a portion extending longitudinally of the stake, said portion having a connection with the stake securing the latch against displacement longitudinally of the stake while accommodating both rotation of the latch about an axis generally parallel with the stake and movement of the latch laterally of the stake, a spring interposed between the latch and the stake urging said portion laterally from the stake, a keeper engageable abutment on said portion, and coacting cam surfaces on said portion and body effective upon rotation of the latch to laterally move the latch in opposition to the spring to a position in which said abutment is disengaged from the keeper.

2. In a stake locking device for a truck or the like having a body provided with a stake socket and a keeper on one side of said socket, a stake insertable into the socket, a latch carried by the stake for engagement with the keeper, said latch having an elongated portion extending generally longitudinally of the stake, one end of the elongated portion having a connection to the stake accommodating axial rotation of the elongated portion and movement of its opposite end toward and away from the keeper, a retainer on the stake for said opposite end, a spring interconnecting the latch and stake tending to move said opposite end toward the retainer, a shoulder on the elongated portion latchably engageable with the keeper to prevent withdrawal of the stake from its socket, said shoulder being located on one side of the elongated portion whereby its latching engagement and disengagement with the keeper is dependent upon the elongated portion being rotatively positioned about its axis to present said side to the keeper when the stake is in the socket, said elongated portion having two flat side surfaces normally cooperating respectively with the retainer when the stake is out of the socket and with the keeper side of the socket when the stake is in the socket to rotatively cam the elongated member into position for latchable engagement of the shoulder with the keeper, both said flat surfaces being rendered ineffective by manual rotation of the elongated portion about its axis to disengage the shoulder from the keeper while the stake is in the socket.

3. In a stake locking device for a truck or the like having a body provided with a socket and a keeper at one side of said socket, a stake to fit the socket, a latch on the side of the stake opposite the keeper when the stake is inserted in the socket, said latch comprising a shank extending generally longitudinally of the stake and terminating at one end with an angularly disposed handle operative to manually rotate the shank about its longitudinal axis, the opposite end of the shank having a connection to the stake securing the shank against longitudinal displacement relative to the stake while accommodating both rotation of the shank about its said axis and movement of its said one end toward and away from the keeper side of the stake, a keeper engageable shoulder on one side of and intermediate the ends of the shank, coacting surfaces on the shoulder side of the shank and the keeper side of the socket effective to rotatively position the shank about its said axis for engagement of the shoulder by the keeper upon movement of said one end away from the stake, and a spring supported by the stake and urging said one end away from the stake.

4. In combination, a bolt, a mounting having connections with the bolt at two points spaced axially of the bolt, both said connections accommodating both pivotal movement of the bolt about its axis and tilting of the bolt axis about one of said connections, the other of said connections comprising a retainer having a bolt receiving opening of a size greater than the bolt cross section disposed therein, said bolt cross section including a cam formation whose contact with the retainer tends to axially rotate the bolt to a predetermined angular relation within said opening, an elastic member resisting bolt retraction away from said contact with the retainer, a shouldered portion on the bolt arranged to latchably engage a part to be locked thereto, and a second cam formation on the bolt arranged to cooperate with a portion of said part in effecting a tilting of the bolt in opposition to the elastic member as the bolt is rotated from a position of latched engagement with said part.

5. In combination, a stake, a member forming a socket to receive the stake, a keeper on the member, a bolt latchably engageable with the keeper to secure the stake against accidental withdrawal of the stake from the socket, said bolt having a connection to the stake accommodating both axial rotation of the bolt and movement of the bolt about said connection, cam surfaces on the bolt axially remote from said connection, an abutment surface on the stake engageable with one of said cam surfaces to limit said bodily movement of the bolt in one direction when the stake is out of the socket, an abutment surface on the member engageable with the other of said cam surfaces to further limit said bodily movement of the bolt in said direction when the stake is in the socket, an elastic element carried by the stake for holding said cam surfaces in engagement with their respective abutment surfaces, said abutment surface on the stake cooperating with the elastic element when the stake is out of the socket to provide a force couple operable on said one cam surface to rotate the bolt partially to latching position, said abutment surface on the member cooperating with the elastic element when the stake is in the socket to both provide a force couple operable on said other cam surface to rotate the bolt to fully latching position, and to frictionally restrain retrograde rotation of the bolt from a fully unlatching position.

6. In combination, a stake, a member forming a socket to receive the stake, a keeper on the member, a releasable latch bolt cooperating with the keeper to secure the stake against accidental withdrawal from the socket, said bolt having a connection to the stake accommodating both axial rotation of the bolt relative to the stake and bodily movement of the bolt about said connection, an abutment surface on the stake, an elastic element connected to the stake and biasing the bolt bodily toward said stake abutment surface, said bolt having a face axially remote from said connection and cooperable with said stake abutment surface under the biasing action of said elastic member to rotatively cam the bolt to substantially its latching position when the stake is out of the socket.

7. In combination with a stake and a member forming a socket to receive the stake, releasable means for securing the stake against accidental withdrawal from the socket including a keeper fixed to one side of the socket and a latch carried by the stake, said latch having a keeper engageable shank extending lengthwise of the stake and a handle for manually rotating the shank from a latched to an unlatched position, said shank having a universal connection to the stake accommodating rotation of the shank and tilting of the shank toward and away from the keeper side of the stake, a spring tending to tilt the shank away from the stake, a cam surface on one side of the shank remote from the connection and coacting under the force of said spring with the keeper side of the socket to rotatively maintain the shank in either latched or unlatched position when the stake is in the socket, and a second cam surface on the shank coacting under the force of said spring with a surface on the stake to rotatively return the shank to latched position upon withdrawal of the stake from the socket while the shank is in unlatched position.

8. In combination, a first member having a socket and a keeper at one side of the socket, a second member for insertion in and withdrawal from said socket, a latch member engageable with the keeper having its forward end mounted loosely on said second member for angular movement around its own axis and for swinging movement in a plane toward and away from said keeper, an abutment on said second member limiting said swinging movement in the direction toward the keeper when the second member is out of the socket, a spring interposed between said second member and said latch member tending to swing the latter into latching engagement with said keeper to retain said second member in said socket, said latch member being manually movable about said axis into unlatching position, said latch member having camming engagement with said abutment when the second member is out of the socket and with said side of the socket when the second member is within the socket the arrangement being such that when the second member is withdrawn from the socket, the latch member is turned by said spring into position to again effect latching engagement when the second member is inserted into the socket.

9. In combination a first member including a socket, a second member for insertion in and withdrawal from said socket, keeper means associated with said socket, a latch member having its forward portion pivotally and swingably connected to said second member for angular movement about an axis lengthwise of itself and swinging movement in a plane toward and away from said keeper, cooperating cam faces on said latch and first members tending to position the latch member in latching engagement with the keeper means when the second member in said socket, said latch member being manually movable about said axis into unlatching position, and other cooperating cam faces on said latch and second members tending to automatically return the latch member to latching position as the second member is withdrawn from the socket.

10. In combination, a latch bolt, a mounting having two connections with the bolt both accommodating both rotation of the bolt about its axis and rocking of the bolt axis about one of said connections, the last mentioned connection comprising a universally jointed fastening and the other connection being axially spaced from the universally jointed fastening and comprising a retainer having a bolt receiving opening of a size greater than the bolt cross section disposed therein, said bolt cross section including a cam formation whose contact with the retainer tends to rotate the bolt to a given angular relation therewith, an elastic member resisting bolt retraction away from said cam formation contact with the retainer, and a shoulder on said latch bolt arranged to latchably engage a part to be locked thereto and to be rocked away from said part upon a rotation of the bolt from the aforementioned angular relation between the retainer and said cam formation.

11. In a stake locking device for a truck or the like having a body provided with a stake receiving socket and a keeper at one side of the socket, a stake insertable in the socket, a latch member on the side of the stake facing the keeper when the stake is inserted in the socket, said latch member comprising a shank extending lengthwise of the stake and a handle operative to axially rotate the shank, said shank having a universal connection to the stake accommodating both axial rotation of the shank and tilting of the shank axis, a keeper engageable abutment on one side of the shank axially remote from said connection, a spring carried by the stake and biasing the shank to a tilted position, cam surfaces on the shank and body cooperating with each other under the force of the spring to rotatively position the shank about its axis for locking engagement of the abutment by the keeper when the stake is in the socket, said cam surfaces being so formed as to cause tilting of the shank in opposition to the spring when the shank is rotated by the handle to unlocked position while the stake is in the socket, said spring cooperating with said cam surface on the body while the stake is in the socket to frictionally restrain retrograde rotation of the shank from its unlocked position, and other cam surfaces on the shank and stake cooperating with each other under the force of said spring to rotatively return the shank to its locking position upon withdrawal of the stake from the socket.

12. The invention defined by claim 11, wherein said handle is substantially in the plane of the stake when the shank is in locking position.

13. In a device of the class described, a member forming a socket, a stake insertable in the socket, a keeper in the socket to prevent withdrawal of the stake a latch having a shank universally pivoted to and extending longitudinally of the stake, a pair of angularly disposed axially adjacent flats on the shank, one of said flats terminating in a shoulder engageable with the keeper when the stake is in the socket, a handle for axially rotating the shank to disengage the shoulder from the keeper, a spring carried by the stake and urging the shank outwardly from the stake, said one flat coacting with the socket wall during said manual rotation of the shank to cam the shank against the spring, said one flat assuming a position substantially normal to the spring and socket wall when the shoulder is fully withdrawn from the keeper whereby retrograde rotation of the shank is frictionally restrained, and a retainer on the opposite side of the shank from the stake, said retainer being carried by the stake and positioned to limit outward movement of the shank under the force of the spring when the stake is out of the socket, said retainer having a face coacting with the other of said flats to automatically return the shank to keeper engageable position upon withdrawal of the stake from the socket.

14. In a stake locking device for a truck or the like having a body provided with a stake receiving socket and a keeper at one side of the socket, a stake insertable in the socket, a latch on the stake opposite the keeper having a shank extending lengthwise of the stake and a handle for axially rotating the shank, a shoulder on one side of the shank engageable with the keeper when the stake is in the socket, a universal connection securing the stake and shank against relative longitudinal displacement, said connection being axially remote from the shoulder and accommodating both axial rotation and tilting of the shank into and out of shoulder engageable relation with the keeper, a spring carried by the stake and operative to tilt the shoulder end of the shank toward the keeper, said shank and stake having surfaces coacting under the force of the spring to rotatively position the shank in shoulder engageable relation with the keeper when the stake is out of the socket, and surfaces on the shank and body coacting under the force of the spring to restrain rotation of the shank from either its shoulder engaged or disengaged relation with the keeper when the stake is in the socket.

15. In combination, a stake, a member forming a socket to receive the stake, a keeper on one side of the socket, a latch bolt on a side of the stake facing the keeper when the stake is in the socket, said bolt extending longitudinally of the stake and having two axially remote connections to the stake, both said connections accommodating both axial rotation of the bolt and movement of the bolt axis about one of said connections, said bolt having two longitudinally separated shank portions intermediate said connections, one of said shank portions having contact with the keeper side of the socket when the stake is in the socket, the other of said connections including an abutment having contact with the other of said shank portions when the stake is out of the socket, an elastic member opposing retraction of the bolt from said abutment and said socket side, and a shoulder on one side of the bolt latchably engageable with the keeper when the stake is in the socket, said one shank portion having a non-circular cross section cooperative with said socket side in response to said spring to rotatively position the bolt about its axis in alternatively shoulder engaged on disengaged relation with the keeper, said other shank portion being out of engagement with said socket side when the stake is in the socket and having a non-circular cross section coacting with said abutment upon withdrawal of the stake to rotatively cam the bolt about its axis into shoulder engageable relation with the keeper.

16. In combination with a stake and a socket for receiving the same, means for releasably locking the stake against accidental withdrawal from the socket including a keeper fixed to one side of the socket and a latch carried by the stake, a recess in the side of the stake facing the keeper when the stake is inserted in the socket, said latch having a shank disposed in the recess, said shank being axially rotatable and tiltable relative to the stake, a flat on one side of the shank having abutting engagement with the keeper side of the socket when the stake is in the socket, said flat terminating in a keeper engageable shoulder, a second flat on the shank angularly related to said first mentioned flat and having abutting engagement with a coacting surface on the stake when the stake is removed from the socket, a spring carried by the stake and biasing the shank outwardly of its recess, said first mentioned flat cooperating with the keeper side of the socket to move the shank against the biasing force of the spring to a frictionally held non-returnable position upon manually rotating the shank from its keeper engaged shoulder position while the stake is in the socket, said second flat being out of contact with said stake surface while the stake is in the socket and coacting with said stake surface to rotatively cam the bolt to its keeper engageable shoulder position upon withdrawal of the stake from its socket.

GORDON ROLLAND JEWELL.

References Cited in the file of this patent

UNITED STATES PATENTS

| Number | Name | Date |
| --- | --- | --- |
| 1,926,352 | Selzer | Sept. 12, 1933 |